United States Patent [19]
Walker, Sr.

[11] 4,182,532
[45] Jan. 8, 1980

[54] VEHICLE ROOF SUPPORT MEMBER

[76] Inventor: Frank S. Walker, Sr., 5831 NW. 17th Pl., Sunrise, Fla. 33313

[21] Appl. No.: 874,152

[22] Filed: Feb. 1, 1978

[51] Int. Cl.² .............................................. B62D 63/08
[52] U.S. Cl. ............................... 296/137 R; 16/94 R; 211/162; 362/74
[58] Field of Search .............. 296/137 R; 362/67, 74, 362/404, 406; 211/94.5, 94, 162; 248/323, 298; 16/87 R, 90, 93 R, 93 D, 94 R, 94 D, 95 R, 95 D, 96 R, 96 D

[56] References Cited
U.S. PATENT DOCUMENTS

| | | | |
|---|---|---|---|
| 1,544,823 | 7/1925 | Fairhurst | 16/87 R |
| 2,587,807 | 3/1952 | Arenberg et al. | 362/74 |
| 3,399,856 | 9/1968 | Pecaut | 211/162 X |
| 3,606,948 | 9/1971 | Strang | 211/162 X |

*Primary Examiner*—Joseph F. Peters, Jr.
*Assistant Examiner*—Norman L. Stack, Jr.
*Attorney, Agent, or Firm*—William Nitkin

[57] ABSTRACT

An improved vehicle roof support member of the type designed to support the roof sheet of a vehicle which roof support member is optionally adapted to contain lighting elements. The roof support member of this invention, in addition to functioning as a roof sheet support can contain lighting elements positioned beneath its top and between its sides, the lighting elements being slideable on a track within the roofing support member so as to be positionable at selected positions to illuminate the interior of the vehicle. As a further object the roof support member may include a screen member extending between the sides of the roofing bow to prevent entry of objects therebetween.

1 Claim, 3 Drawing Figures

VEHICLE ROOF SUPPORT MEMBER

BACKGROUND OF THE INVENTION

This invention relates to roof support members and more particularly relates to a novel roof support bow design adapted to both support the roofing sheet of a vehicle and optionally to accept and contain lighting means adjustably positioned therein to illuminate the interior of the vehicle.

Currently vehicles such as trucks or trailer vans have their roof sheets supported by typical I beam construction members extending from side to side across the body of the van portion of the vehicle. To illuminate the interior of a vehicle, dome lights, skylights, translucent fiber glass tops, daylight, or directed artificial light from the open end of the vehicle have been utilized which lighting means have the following disadvantages. A problem with dome lights is that they may protrude into the vehicle's cargo space and get in the way of objects within the vehicle and can be damaged by movement of the cargo during transit. Skylights usually held in place by rubber gaskets may have a tendency to be accidentally dislodged or deliberately moved to ventilate the interior of the vehicle's body. Translucent fiber glass roofs will admit light during daylight hours but in the evening there is no light for transmission therethrough, and the interior of the vehicle is consequently dark. There is some use of flood lights on loading platforms directed to shine into the interior of the vehicle's van which can cause a worker to work in his shadow. When such worker faces the light in order to come out of the van, he can be temporarily blinded by the brilliant light. Natural light entering through the doorway is available only during daylight hours.

SUMMARY

It is an object of this invention to provide a novelly designed roofing support bow member which can be utilized to support the roofing sheet of a vehicle's van, add structural strength to the vehicle, and further be optionally adapted to include a protected and damage-resistant vehicle interior lighting system that will operate safely notwithstanding the presence of moving cargo within the truck.

It is a further object of this invention to disclose a roofing support which can have such an optional illumination system contained therein operable either on the vehicle's 12 volt current or 110 volt current from a loading zone.

The objects of this invention will become clearer with reference to the following drawings and Description of the Preferred Embodiment.

DESCRIPTION OF THE PREFERRED EMBODIMENT

Figure 1:
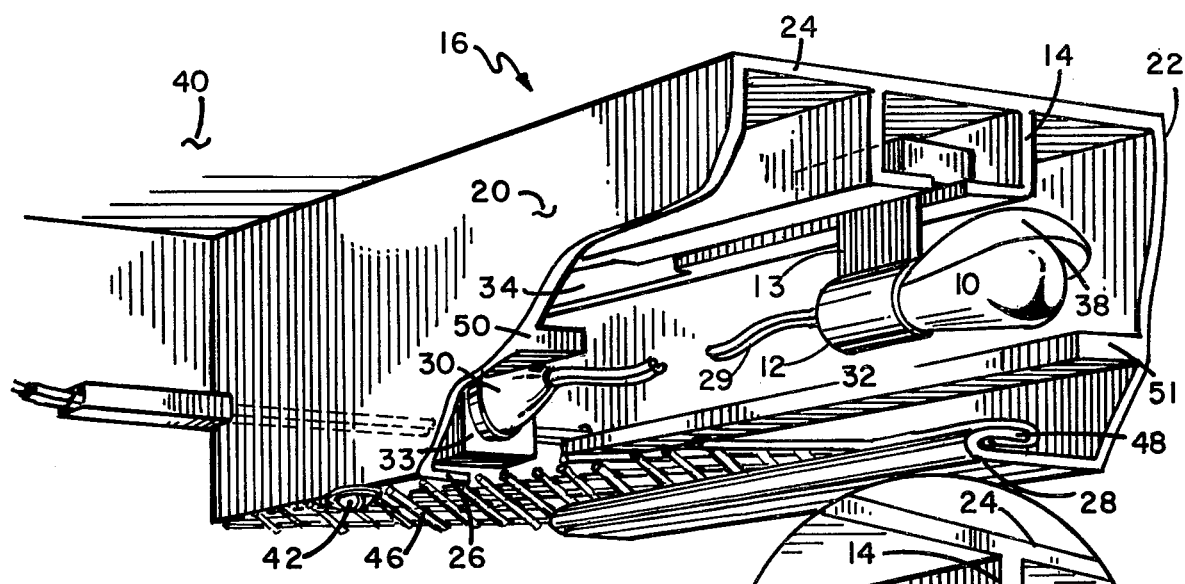
FIG. 1 illustrates a perspective cross-sectional cutaway view of a roofing bow as provided for in the present invention with lighting means in position therein.

FIG. 1 illustrates a cutaway view of a single roofing bow member 16. Such roofing bow member extends from side to side transversely across the van body supporting the roof sheet and can be spaced two feet from one another or at any appropriate distance necessary to provide proper support. Roofing bow member 16 consists of top member 24 which faces, substantially makes contact with, and supports roofing sheet 40 at the top of the vehicle. Affixed to both sides of top member 24 are parallel sides 20 and 22. Substantially central to top member 24 and running along its bottom parallel to sides 20 and 22 is track member 14. This track member can consist either of a male projection adapted to accept a female complementary insert or a female insert adapted to receive a complementary male projection. The roofing bow member of this invention can be formed from one extruded piece of aluminum or other equivalent metal. Optional lighting means can be provided such as light bulb 10 affixed in socket 12 which has a complementary coupling 13 to fit either into or around track member 14 of the roofing bow member. An aperture 34 can be provided for the insertion of such lighting member into or onto track member 14 at any position along the track but preferably located at either end of the roofing bow. Once the lighting member has been attached to central track 14, it can be slid to a desired position anywhere along the roofing bow. Electrical power is transmitted along a series of wires. Illustrated is wire 29 which extends from light socket 12 and terminates in plug member 30. Equivalent means of supplying power can be utilized. A plug socket can be provided at the base of each roofing bow or at alternate positions along the interior of the van for its connection with plug member 30 of the lighting means. Such plug sockets must be interconnected by a series of wires to power sources such as the 12 volt truck current or it can alternately be connected to a wiring system adapted to carry 110 volt current provided from a loading platform by interconnection with a coupling device as will be described below. More than one lighting member 10 can be utilized and a series of them can be inserted onto track 14 depending upon the amount of illumination desired. These lights can be interconnected parallelly or in series and can be inserted from either end or at any place within track 14 that has an insertion aperture 34. The lighting member can be of the type having a bulb with a reflector integrally part of the bulb or can have a reflector 38 affixed above the bulb as illustrated in FIG. 1. Roofing support member 24 can be affixed to roofing sheet 40 by similar means as current roofing bows are affixed to roofing sheets such as by bolting, welding or equivalent means. As mentioned before these roofing support bows can be located according to the manufacturer's desired spacings from one another which in many cases is 24" off-center and the roofing support bows should be tightly bonded to the roofing sheet to eliminate any roof flutter caused by working action between the roofing bows and the roof sheet. Since there can be much stress within a large trailer carrying heavy cargo, the roofing bows must be of sufficient strength to prevent flexing of the van. It should be noted that sides 20 and 22 project below the lighting means so as to protect them from objects striking from the side or striking from the bottom if such objects are wider than the opening between sides 20 and 22. In some instances it is desired to prevent narrow objects from striking upward between parallel sides 20 and 22 which could damage the lighting means contained therein. Therefore there can optionally be provided at the base of roof bow 16 flange members 26 and 28 which are extensions of side members 20 and 22 and can be extruded in one piece if desired in such embodiment. These flange members can contain a series of apertures 42 defined therein for receipt of attachment means of screen mesh 46 or any equivalent protective member. For example a fiber glass translucent sheet could also be affixed to flange members 26 and 28 by screws or equivalent attachment means which would pass light therethrough but still protect the lighting means from being struck by objects. One embodiment of the invention illustrated in FIG. 1 shows a flange catch member 48 incorporated as part of flange member 28 so that one side of protective screen member 46 can be hingeably hooked around flange catch member 48 and the other side affixed by screws to the opposing flange. When unscrewed, the protective mesh screen 46 will hinge downward on liplike flange catch member 48 to allow for manipulation of the lighting means within the roofing bows. Also within the extruded bow can optionally be added sections thereof forming ribs 50 and 51. These ribs can act as support for the ballast of a fluorescent fixture if fluorescent fixtures are to be utilized within the roofing bow as illumination means.

Figure 2:
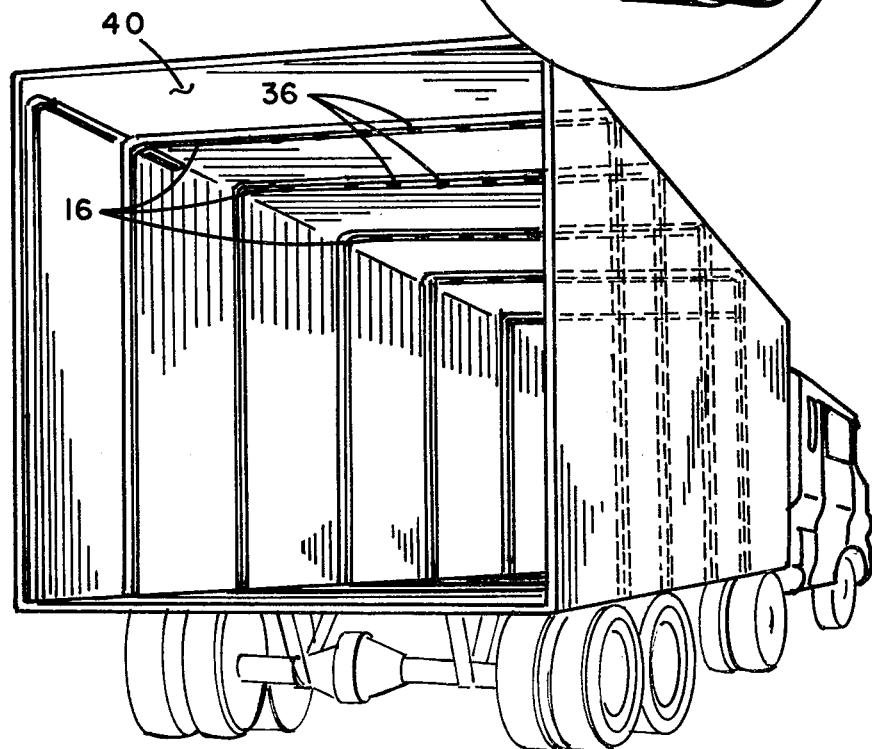
FIG. 2 illustrates a rear end view of a truck body showing the roofing bows of this invention in position with illumination means contained therein.

FIG. 2 illustrates a rear end view of a truck body showing a plurality of roofing bow support members 16 disposed horizontally under roofing sheet 40. Within each of the roofing bows are illumination means 36.

Figure 3:
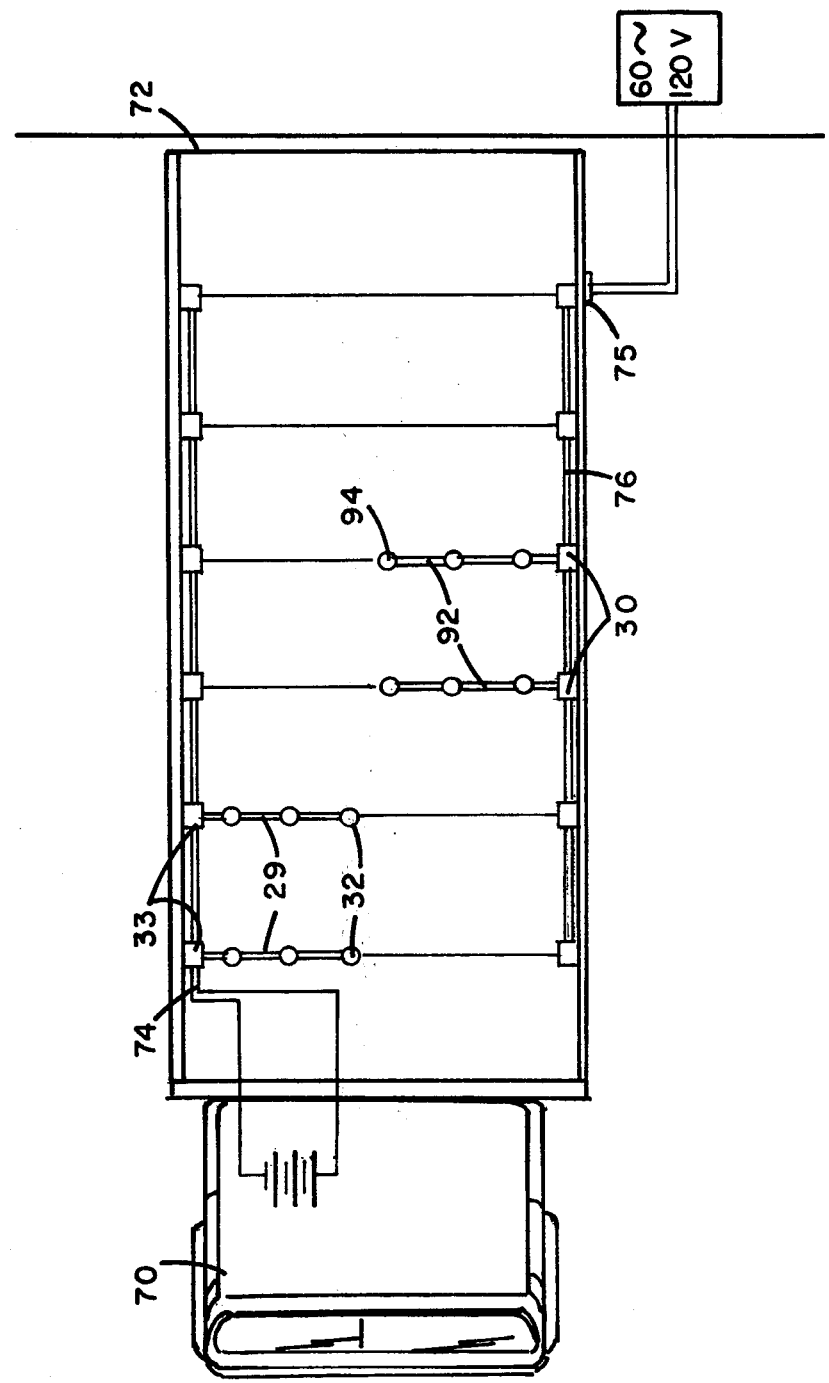
FIG. 3 illustrates a wiring diagram as viewed from the top of a trailer van showing truck current and house current junction plugs.

FIG. 3 illustrates a top view of a truck showing a typical wiring diagram in which view the front of the trailer is designated by numeral 70 and the rear, by numeral 72. Extending from the cab is 12 volt current line 74 and positioned at the rear of the cab is socket member 75 adapted to receive a 110 volt line 76 which can be an extension cord or other equivalent plug device extending from terminal 78 where the truck is loaded or unloaded. It should be noted that the use of a readily releasable type plug would be most beneficial at socket member 75 since the driver of the trailer may forget to disconnect the plug when he drives away from the terminal. Such a quick release plug can include a spring-loaded socket member 75 so that when disconnected, it will withdraw into a shaft member thereby pulling it out of the way. 12 volt line 74 runs from its source within the cab along the inside of the van preferably near the roofing bows and is provided with a plurality of internal plug socket members 33 in the vicinity of the base of each roofing bow into which electrical lines 29 running from light members 32, having plug members 30 thereon, can insert for electrification of the individual lighting members 36. It should be noted the roofing bow support member can in some instances act as one electric pole if the body of the vehicle is positively or negatively grounded and the bow support member is interconnected therewith. In the same way the 110 volt line can be provided with a series of socket elements 33 thereon into which a 110 volt bulb can be connected by plug member 30. It should be noted that a series of bulbs could be interconnected with one another in line with the electrical lines running from one bulb to the next as shown by electrical line 92 running to a second in-line light member 94. In this manner a number of bulbs could be physically positioned within the roofing bow channel track depending upon the lighting needs within the truck.

Although the present invention has been described with reference to particular embodiments, it will be apparent to those skilled in the art that variations and modifications can be substituted therefor without departing from the principles and spirit of the invention.

I claim:

1. A truck trailer roofing support bow member comprising:
   a unitary light housing adapted for the support of said truck roof and support of protected movable lights therein having:
   (a) a planar elongated top member having a top, bottom, and parallel first and second sides;
   (b) an elongated first and second side members, each having a top edge and bottom edge, said first side member affixed at a top edge to said first side of said top member and said second side member affixed at a top edge of said second side of said top member;
   (c) a light track member having a channel member defined therein affixed to the bottom of said top member, said light track member further having defined therein a light holder receipt aperture within a portion of said channel;
   (d) a protective screen member having a first and second side;
   (e) a first and second laterally extending flange member, said first flange member affixed to the bottom edge of said first side member, said second flange member affixed to the bottom edge of said second side member, said first flange member including a lip member adapted to be hingably attached to said first side of said protective screen member and said second flange member including releasable attachment means to hold the second side of said protective screen to prevent entry of objects into said unitary light housing for the protection of elements contained therein;
   (f) a first rib member incorporated upon the interior of said first side member and a second rib member incorporated upon the interior of said second side member;
   at least one light bulb member including a holder member adapted, upon the opening of said protective screen member, to be insertable through said light holder receipt aperture and slidably retained to said channel member, said light bulb member adapted not to extend below said first and second side members; and
   means to supply electrical power from a power supply to said light bulb member.

* * * * *